United States Patent [19]

Shiba et al.

[11] Patent Number: 5,195,070
[45] Date of Patent: Mar. 16, 1993

[54] OPTICAL INFORMATION PROCESSING APPARATUS AND OPTICAL PICKUP THEREFOR

[75] Inventors: Masataka Shiba; Kazumi Kawamoto; Yasuo Hira; Akira Inagaki; Hidemi Sato; Kenchi Ito; Atsuko Fukushima; Ryuichi Funatsu, all of Yokohama, Japan

[73] Assignee: Hitachi, Ltd., Tokyo, Japan

[21] Appl. No.: 551,794

[22] Filed: Jul. 12, 1990

[30] Foreign Application Priority Data

Jul. 12, 1989 [JP] Japan .................. 1-177935
Jul. 12, 1989 [JP] Japan .................. 1-177936

[51] Int. Cl.$^5$ ........................................... G11B 11/14
[52] U.S. Cl. ................................... 369/44.12; 369/112
[58] Field of Search ............... 369/121, 122, 44.12, 369/112, 44.23, 44.24, 44.11, 110, 109; 250/201.5

[56] References Cited

U.S. PATENT DOCUMENTS

| | | | |
|---|---|---|---|
| 3,655,261 | 4/1972 | Chang ..................... | 350/96 |
| 4,737,946 | 4/1988 | Yamashita et al. ........ | 369/45 |
| 4,887,255 | 12/1989 | Handa et al. .............. | 369/112 |
| 4,910,723 | 3/1990 | Yamamoto ................ | 369/44 |
| 4,991,160 | 2/1991 | Premji ..................... | 369/44.12 |

FOREIGN PATENT DOCUMENTS 61-85661 1/1986 Japan .
63-100631 2/1988 Japan .
62-68879 3/1988 Japan .

OTHER PUBLICATIONS

Efficient Accousto Optical Coupling of Guided to Substrate Modes in a Combined Acoustical/Optical Channel Guide, V. Hinkov, U. Nolte and W. Sohler, pp. 138-141.

Primary Examiner—Tommy P. Chin
Assistant Examiner—Robert Chevalier
Attorney, Agent, or Firm—Antonelli, Terry, Stout & Kraus

[57] ABSTRACT

Using an optical pickup, recording/reproducing of information is performed by irradiating light beams to an optical recording medium to form light spots. The optical pickup includes means for generating plural light beams, an optical waveguide for guiding the plural light beams in a row into a flat space, and a light deflecting element for deflecting the light beams, which run in the optical waveguide, within a plane formed by a vector perpendicular to a plane of the optical waveguide and a directional vector of the light beams. The light deflecting element deflects the plural light spots, which are to be arranged in a row, in a direction perpendicular to the light spot row to perform micro seek.

48 Claims, 15 Drawing Sheets

Da Db Dc Dd
OUTPUT SIGNALS

OPTICAL INFORMATION PROCESSING APPARATUS AND OPTICAL PICKUP THEREFOR

BACKGROUND OF THE INVENTION

1. Field of the Invention

This invention relates to an optical information processing apparatus for performing recordation and reproduction of information on an optical recording medium, and more particularly to an optical pickup using an optical waveguide, and an optical information processing apparatus using the optical pickup.

Here in this specification, "processing information" means reproducing and/or recording information on an optical recording medium.

2. Description of the Related Art

Heretofore, in an effort to minimize access time of an optical information recording apparatus, an optical pickup was proposed by Japanese Patent Laid-Open Publication No. 129938/1985, in which an SAW (Surface Acoustic Wave) light deflector is located on an optical waveguide and tracking is performed with no mechanical movable part, thus reducing a micro seek time sharply. This system has a structure such as shown in FIGS. 12A and 12B. In the optical pickup of FIGS. 12A and 12B, light emitted from a semiconductor laser 1 is introduced into an optical waveguide layer 3, which is formed on a substrate 2, according to an end-surface connecting method. The light beams that have been made parallel according to a geodesic or mode-index type coupling lens 7 are diffracted due to a SAW (Surface Acoustic Wave) generated when a high-frequency a.c. voltage is applied to an SAW electrode 5, and are focused on an optical disk substrate 4 by a diffraction grating objective lens 8, thus forming a light spot 11. Return light beams run through the objective lens 8, the SAW 6 and the coupling lens 7 and are then bent by a bend diffraction grating 9 to reach a quartered optical sensor 10.

Focusing is provided as follows by Foucault's method:

$$S_{focusing} = (D_a + D_d) - (D_b + D_c) = 0.$$

Tracking is also provided as follows by the push-pull method:

$$S_{tracking} = (D_a + D_b) - (D_c + D_d) = 0.$$

Further, a detection signal is obtained as follows:

$$S_{signal} = D_a + D_b + D_c + D_d = 0.$$

By varying the frequency of a.c. voltage to be applied to the SAW electrode 5, the light spot 11 is moved in the direction of x, namely, radially of the optical disk substrate 4 to perform micro seek and tracking control.

In this prior art, because of the structure of the SAW light deflector, the number of the light spots focused and formed on the optical recording medium would be one. As advances have recently been made on performance of optical information recording apparatuses, the need to form plural light spots on the optical recording medium such as by adapting the tracking error detecting method, which is a three spot method resistant to surface vibration of a disk, by the multiple beam method, which enables to check erasing, recording and reproducing immediately after recording, or by the multiple channel method to improve the transfer rate of data.

However, since the SAW light deflector of the prior art can be dealt with only a single light spot, it would necessarily require as many SAW light deflectors as the number of light spots. Because the size of the individual SAW light deflector must be restricted, it is difficult to produce plural light spots close to one another. Therefore, for plural light spots, this kind of SAW light deflector cannot be used, and mechanical deflectors such as rotary mirrors must necessarily be used.

Consequently, with the prior art, it was difficult to reduce a micro seek time when forming plural light spots on the optical recording medium. This will be discussed more in connection with FIG. 4.

In FIG. 4, reference numeral 2 designates a substrate; 3, an optical waveguide layer; 5, an SAW electrode; 5a, an exciter circuit; and 6, an SAW. For introducing plural light beams into the optical waveguide layer 3, it is necessary to use collimated light beams 13a, 13b, 13c, whose angles are slightly different from one another, in view of the characteristic of the optical waveguide. The light beams emitted from the optical waveguide layer 3 by a linear grating coupler 14 run through a diffraction grating 15 for correcting fluctuations of wavelength, a prism 16 and an objective lens 8 to form light spots 11a, 11b, 11c on a single row. At that time, deflection of light beams by the SAW 6 occur within the plane of the optical waveguide layer and, as a result, the direction of scanning the light spots 11a, 11b, 11c is aligned with the direction y of arrangement of the light spots.

Therefore, with the prior art, it was impossible to detect a tracking error of the three-spot method requiring plural light spots, to form plural light spots on one and the same track such as by the multi-beam method, and to scan the plural light spots perpendicularly to the row of the light spots.

Further, in the multi-channel method, as shown in FIG. 11, since the light spots 11a, 11b, 11c are spaced from one another by more than the intertrack distance, they would be formed on the tracks 12a, 12b, 12c spaced from one another by several to tens tracks. Therefore, in the prior art, it was not impossible to arrange plural light spots on adjacent tracks.

SUMMARY OF THE INVENTION

It is therefore an object of this invention to provide an optical pickup using an optical waveguide, in which plural light spots can be deflected at the same time, thus reducing access time.

Another object of the invention is to provide an optical information processing apparatus using the above-described pickup.

These objects of the invention can be accomplished by adapting a so-called co-linear light deflecting method, in which a vector of the direction the light beams run in the optical waveguide layer is oriented to another vector of the direction of deflecting the light beams.

Namely, in the invention, plural light beams, whose incident angles to the light deflecting element are slightly different, are deflected simultaneously to the same extent so that plural light spots can be deflected on the optical disk substrate.

According to a first aspect of the invention, there is provided an optical information processing apparatus for performing information process on an optical recording medium having tracks on which information is to be recorded, the apparatus comprising: an optical pickup for irradiating one or more light beams to the recording medium and for detecting reflected light of the light beams; a recording medium drive means for moving the recording medium relative to the optical pickup; and a signal processing means for controlling the light beams of the optical pickup and for performing information process on the recording medium; the optical pickup including at least one light source, an optical waveguide for guiding one or more light beams from the light source, a light deflecting element disposed in the optical waveguide for deflecting the light beams running in the optical waveguide, within a plane formed by a vector in that running direction and a vector perpendicular to a plane of the optical waveguide, based on a control signal from the signal processing means, an optical system for focusing the light beams, which are outputted from the light deflecting element, on the recording medium to form light spots, and sensor elements for detecting the reflected light from the recording medium.

It is preferable that the optical pickup includes means for generating plural light beams. For example, the light beam generating means may be composed of plural light emitting elements as the light source. Alternatively, the light beam generating means may include means for dividing one light beam, which is emitted from the light source, into plural light beams. Also, the plural light emitting elements may be arranged in such a manner that the light beams to be emitted to the recording medium form light spots in a row on the recording medium. Preferably the optical pickup is located in such manner that the individual light spots are formed on adjacent tracks and that the row of the light spots is disposed at an angle to the track.

The light deflecting element may include means for forming a linear grating coupler from the optical waveguide and by propagating a surface acoustic wave to the optical waveguide. The linear grating coupler forming means may be located so as to propagate the surface acoustic wave substantially in parallel to the running direction of the light beams. Alternatively the light deflecting element may include a linear grating coupler disposed on the optical waveguide, and means for generating an electric field in the optical waveguide to control an emitting angle of the light beams from the linear grating coupler. Further, the light deflecting element may be an acousto-optical element.

According to a second aspect of the invention, there is provided an optical pickup for an optical information processing apparatus for performing information process on an optical recording medium having tracks on which information is to be recorded, the optical pickup comprising: at least one light source; an optical waveguide for guiding one or more light beams from the light source; a transparent substrate for supporting the optical waveguide; a light deflecting element for deflecting the light beams, which run in the optical waveguide, so as to strike on the transparent substrate, based on a control signal from the information processing apparatus; an optical system for focusing the deflected light beams as a light spot on the recording medium; and sensor elements for detecting reflected light of the light beams from the recording medium.

According to a third aspect of the invention, there is provided a method of tracking in an optical information processing apparatus, comprising: generating at least one first light beam for inputting and outputting information, and one or more second light beams for tracking; introducing the first and second light beams into a flat light waveguide; deflecting the first and second light beams, which run in the optical waveguide, within a plane formed by a vector in the running direction of the first and second light beams and a vector perpendicular to the plane of the optical waveguide; irradiating the deflected first and second light beams to the recording medium via an optical system to form light spots on the recording medium; branching, from the optical system, the light beams struck on the optical system as reflected from the light spots; detecting the branched light beam by sensor elements; obtaining a tracking error signal from a detection signal concerning the second light beams; and varying a deflection angle of the light deflecting element according to the tracking error signal in such a manner that the tracking error signal is zero.

According to a fourth aspect of the invention, there is provided an optical information processing apparatus for performing information process on an optical recording medium having tracks on which information is to be recorded, the apparatus comprising: means for generating plural light beams; means for guiding the plural light beams in a row into a flat space; means for deflecting all of the light beams, which run in the flat space, within a plane formed by a directional vector of the light beams and a vector of a plane in which the light beams are arranged in a row; an optical system for irradiating the deflected light beams on the recording medium to form light spots thereon; means for detecting the deflected light beams from the recording medium; means for obtaining a tracking error from a detection signal from the detecting means; means for controlling a deflection angle of the light beams in such a manner that the tracking error is zero; and a reproducing means for reading, from the detection signal, information recorded on the tracks of the recording medium.

Preferably, the optical information processing apparatus further includes information recording means for recording information on the recording medium. In this case, the plural light beam generating means may be composed of plural light emitting elements which are able to be driven independently, and the information recording means may have a function of coding a signal including data to be recorded and a function of driving, of the light emitting elements, those to be used for recordation of information.

The co-linear light deflecting method is exemplified by U.S. Pat. No. 3,655,261 to Chang.

Assuming that plural light beams, whose incidence angles are slightly different from one another, are introduced into the co-linear light deflector, the light beams will be emitted from a linear grating coupler which is formed on an optical waveguide layer 3 by the SAW 6 as shown in FIG. 5. FIG. 6 is a fragmentary, enlarged cross-sectional view of FIG. 5.

In FIGS. 5 and 6, the collimated light beams 13$a$, 13$b$, 13$c$ run in an optical waveguide layer 3. When a high-frequency voltage is applied to comb-shaped SAW electrodes 5, an SAW is produced in the form of an optical waveguide layer and runs from the electrodes 5 toward an SAW absorber 17 at the speed of acoustic wave. At that time, the vector of the running direction of the light and the vector of the running direction of the SAW 6 are parallel though their directions are opposite to, so that a co-linear action occurs. As a result, by the action of SAW, the light is emitted from the optical waveguide. And by varying the frequency of the voltage to be applied to the SAW electrodes, it is possible to vary the incidence angle by DH.

With this co-linear light deflector, as shown in FIG. 5, the light spots 11a, 11b, 11c formed corresponding to the incident light beams 13a, 13b, 13c are arranged in a row, and the scanning direction may be perpendicular to the light beam row.

FIG. 7 shows another co-linear light deflecting method, in which two electrodes 20, 20' are located forwardly and rearwardly of a linear grating coupler 14 and emitting light from the optical waveguide layer. When a voltage is applied to the electrodes 20, 20', it is possible to vary the reflection factor of the optical waveguide layer 21 around the linear grating coupler 14 and hence to vary the direction of emitting the light beams.

Thus, with the co-linear light deflector, it is possible to detect a tracking error of the three-spot method as shown in FIG. 10. Also, the multi-beam method and multi-channel method can be realized.

The above and other advantages, features and additional objects of this invention will be manifest to those versed in the art upon making reference to the following detailed description and the accompanying drawings in which several preferred embodiments incorporating the principles of this invention are shown by way of illustrative example.

DETAILED DESCRIPTION

The construction and principles of a co-linear light deflecting element to be used in this invention will now be described with reference to FIGS. 5-7, 8A and 8B.

Figure 5:
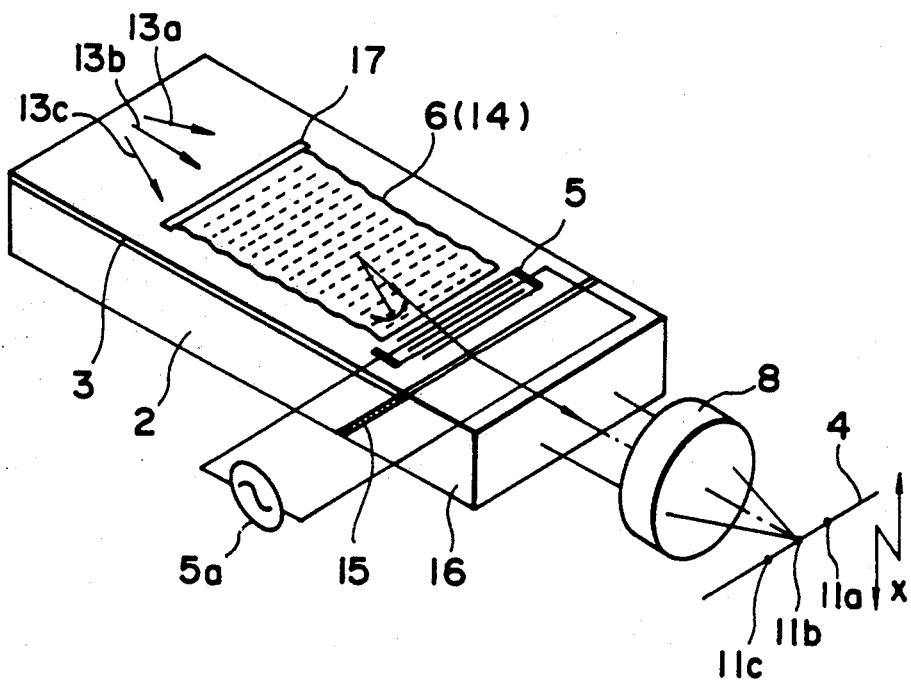
FIG. 5 is a schematic perspective view similar to FIG. 4, showing a first example of an SAW deflector serving as a light deflecting element.

In FIG. 5, a flat optical waveguide layer 3, which functions as a light beam guide means, is disposed on a transparent substrate 2. On the optical waveguide layer 3, an SAW generating means as a light deflecting element is disposed. This SAW generating means includes SAW electrodes 5 disposed on the optical waveguide layer 3 for propagating an SAW substantially in parallel to the running direction of the light beams 13a, 13b, 13c, and an exciter circuit 5a for applying an exciting voltage to the SAW electrodes 5. In this example, an SAW absorbing plate 17 for terminating propagation of the SAW 6 is also disposed on the substrate 2.

On the emitting end of the substrate 2, a diffraction grating 15, for correcting fluctuation of wavelength, and a glass prism 16 are disposed as an optical system for forming light spots 11a, 11b, 11c , by causing the deflected light beams to strike on an optical disk 4, which is a recording medium. Outside the substrate 2, an objective lens 8 is disposed as the optical system.

The light deflecting element of this example is in the form of a linear grating coupler 14 (hereinafter called "SAW coupler") by producing an SAW 6 substantially in parallel to vector of the running direction of the laser light beams 13a, 13b, 13c.

Figure 6:
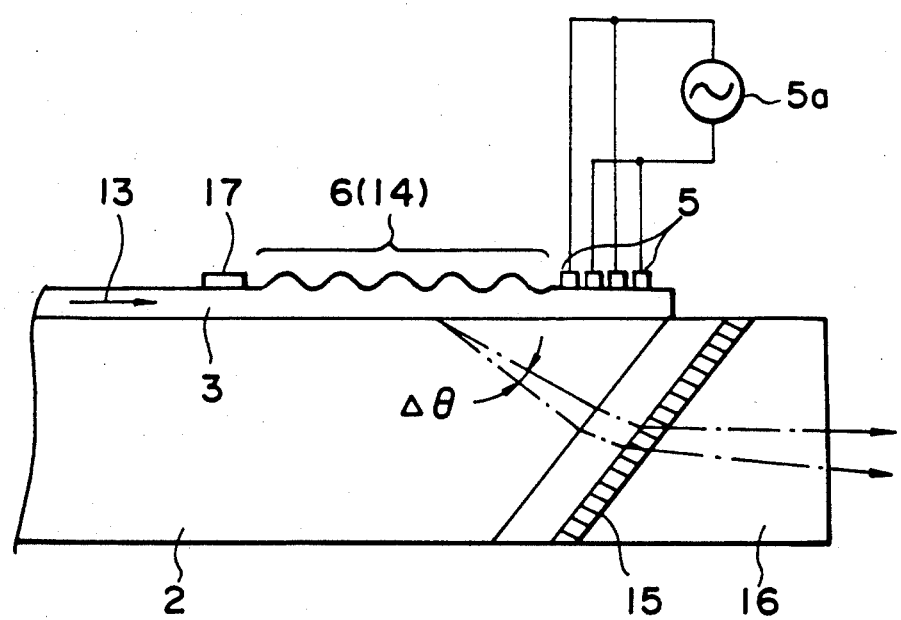
FIG. 6 is a cross-sectional view of the SAW deflector of FIG. 4.

As shown in FIG. 6, when a high-frequency a.c. voltage (exciting voltage) is applied to the SAW electrodes 5 by the exciter circuit 5a, an SAW 6 occurs to form a periodically varying uneven linear grating coupler 14. As a result, the light beams 13 are emitted from the optical waveguide layer 3 toward the substrate 2. Because the period of the SAW 6, namely, the pitch of the uneven surface of the linear grating coupler 14 is dependent on the frequency of an a.c. voltage to be applied to the SAW electrodes 5, the angle of emission will vary by $\Delta\theta$ in association with the change of the frequency. Thus, as shown in FIG. 5, the light spots 11a, 11b, 11c formed by the objective lens 8 are scanned perpendicularly to the row of the light spots.

As mentioned above, since the light deflecting element of this example is in the form of the SAW coupler 6 (14), which deflects the light beams radially of the light disk substrate 4, deflecting within the plane formed by a vector perpendicular to the general plane of the optical waveguide layer 3 and a vector of the running direction of the light beams 13a, 13b, 13c running straightly in the optical waveguide layer 3, the diffraction efficient would be subjected to almost no change, stabilizing the light beam intensity and preventing occurrence of zero order light and a higher order diffracted light. And high-precision tracking and high-speed micro seek can be realized, causing the S/N ratio of a detection signal.

The method for scanning plural laser light spots perpendicularly to the light spot row can be realized also by the electro-optical effect of the optical waveguide layer.

Figure 7:
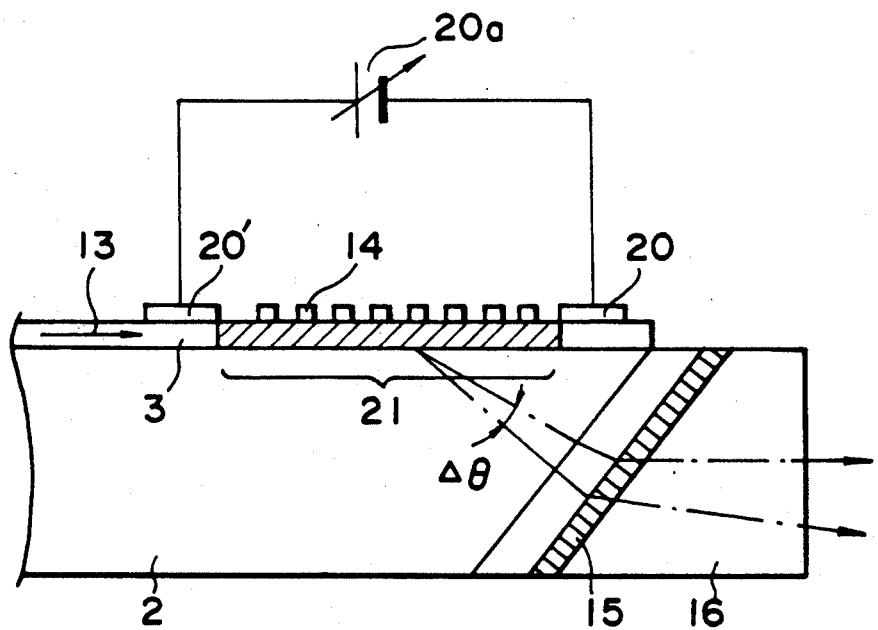
FIG. 7 is a schematic cross-sectional view similar to FIG. 6, showing a second example of the SAW deflector.

In FIG. 7, the light beams 13 run through the optical waveguide layer 3 are emitted toward the substrate 2 due to the linear grating coupler 14. The emitting angle at that time is determined by the grating pitch of the linear grating coupler 14, the refractive index of the substrate 2 and the optical waveguide layer 3, and the wavelength of the laser light 13.

Now when a voltage is applied from a d.c. variable voltage source 20a, which constitutes a voltage applying circuit, to the electrodes 20, 20', an electric field is produced in the optical waveguide layer 21 between the two electrodes 20, 20'. Using a material which is large in electro-optical effect, the refractive index of the optical waveguide layer 3 varies depending on the intensity of the electric field, so that the emitting angle Δθ can be varied. Therefore, with the objective lens 8 of FIG. 5, like the SAW coupler of FIG. 6, it is possible to scan plural light spots perpendicularly to the light spot row.

Figure 4:
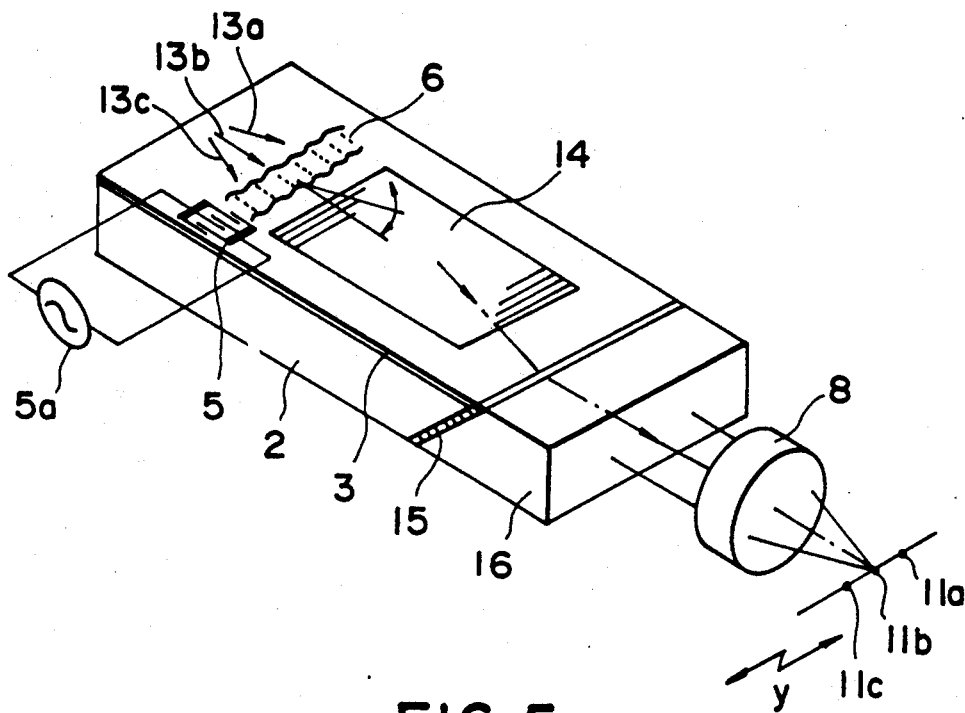
FIG. 4 is a schematic perspective view showing the principle of a prior art SAW light deflector.
Figure 10:
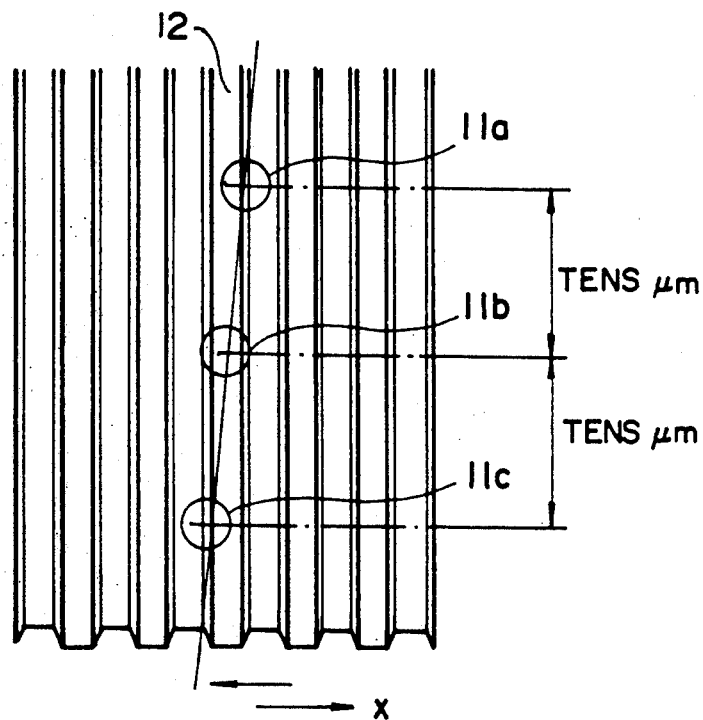
FIG. 10 is a diagram showing the positional relationship between three light spots and tracks according to the SAW deflector in the invention.
Figure 11:
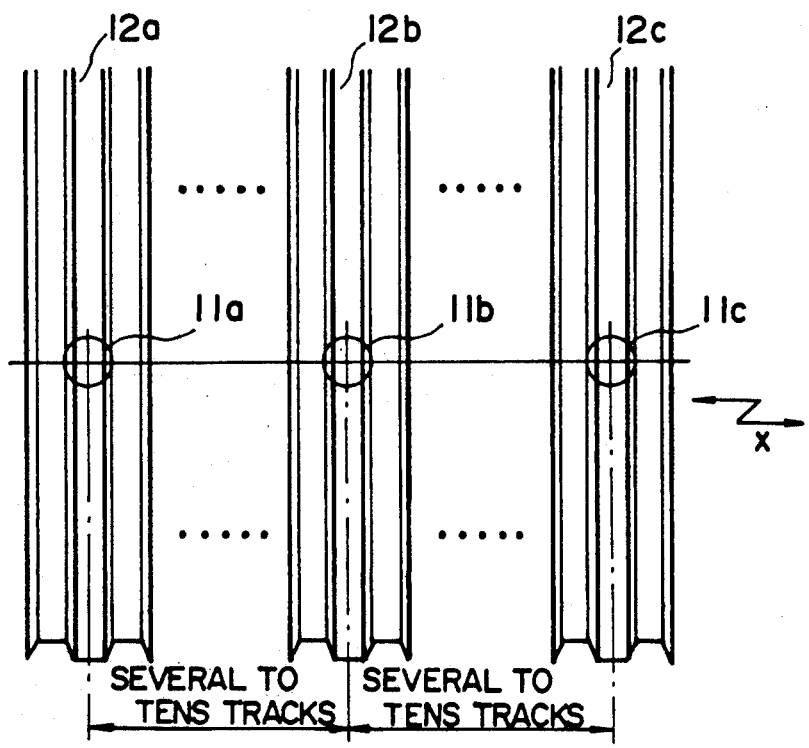
FIG. 11 is a diagram showing the positional relationship between three light spots and tracks according to the prior art SAW deflector.
Figure 12:
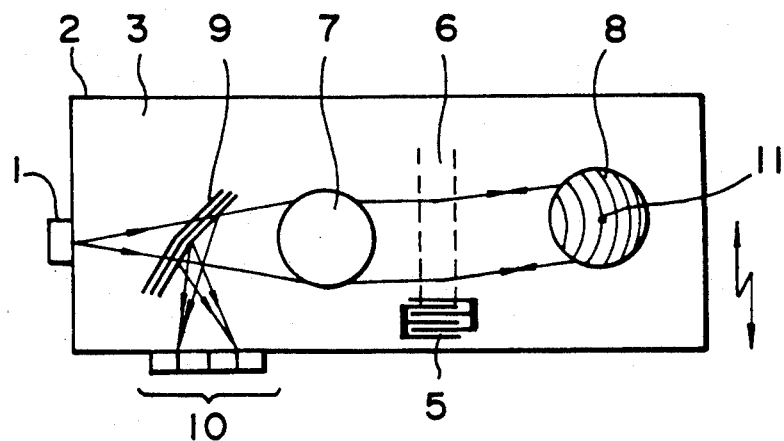
FIG. 12A is a schematic plan view of an optical pickup using the prior art SAW deflector.
FIG. 12B is a side elevational view of FIG. 12A.
Figure 12:
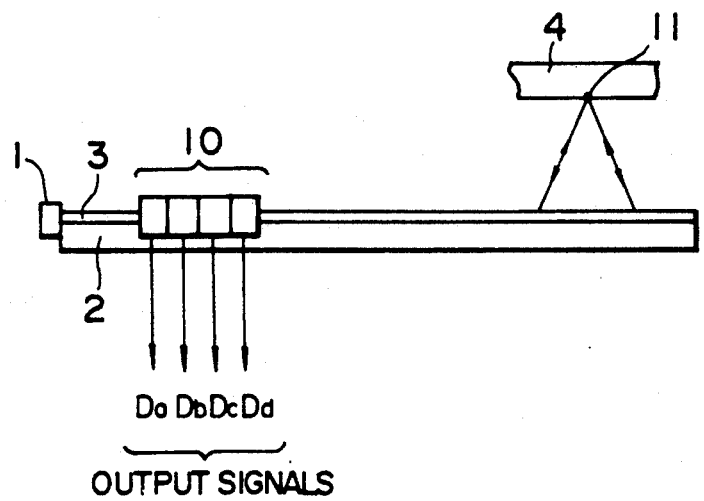

According to this invention, it is possible to overcome the prior art problems discussed in connection with FIG. 4. Specifically, in the prior art, as shown in FIG. 4, deflection of the SAW 6 is performed within the plane of the optical waveguide layer 3. For example, if plural light beams 13a, 13b, 13c are intended to be deflected by the SAW 6, the scanning direction will be aligned with the row of the light spots 11a, 11b, 11c in the direction of y. Consequently, as shown in FIG. 10, the plural light spots are formed linearly on tracks and hence cannot be scanned perpendicularly to the light spot row. For example, as shown in FIG. 11, the plural light spots 11a, 11b, 11c are formed on the separate tracks 12a, 12b, 12c which are spaced from one another several to tens tracks, and the scanning direction is aligned with the light spot row.

In FIGS. 4, 13a, 13b, 13c designate the collimated laser light beams running straightly in the optical waveguide layer 3; 14, a linear grating coupler which is constituted by a straight diffraction grating and emits light from the optical waveguide layer 3 to the substrate 2; 15, a laser diffraction grating for correcting fluctuation in wavelength; and 16, a glass prism.

Various kinds of optical pickups each having an optical deflecting element of the above principles, and various kinds of optical information processing apparatuses each using such an optical pickup will now be described with reference to the accompanying drawings.

Throughout several embodiments and examples, like reference numerals designate similar parts, and overlapping in description is omitted for clarity.

Figure 1A:
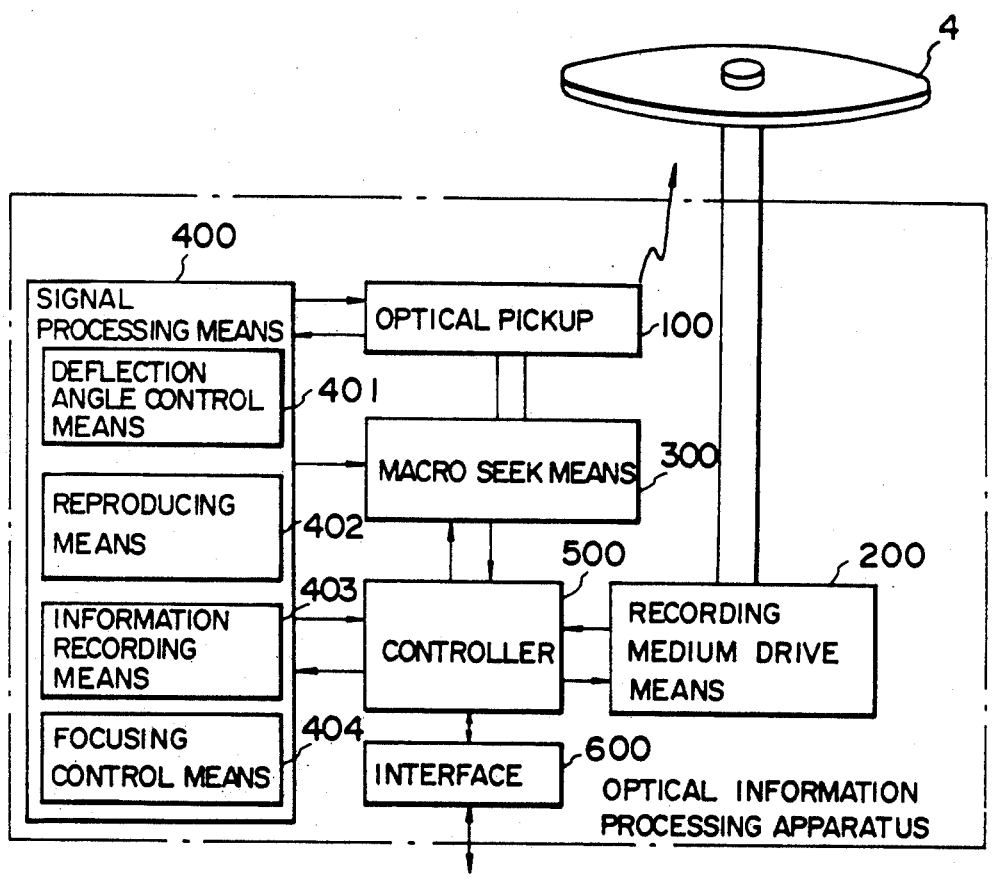
FIG. 1A is a block diagram of an optical information processing apparatus according to a first embodiment of this invention.
Figure 1B:
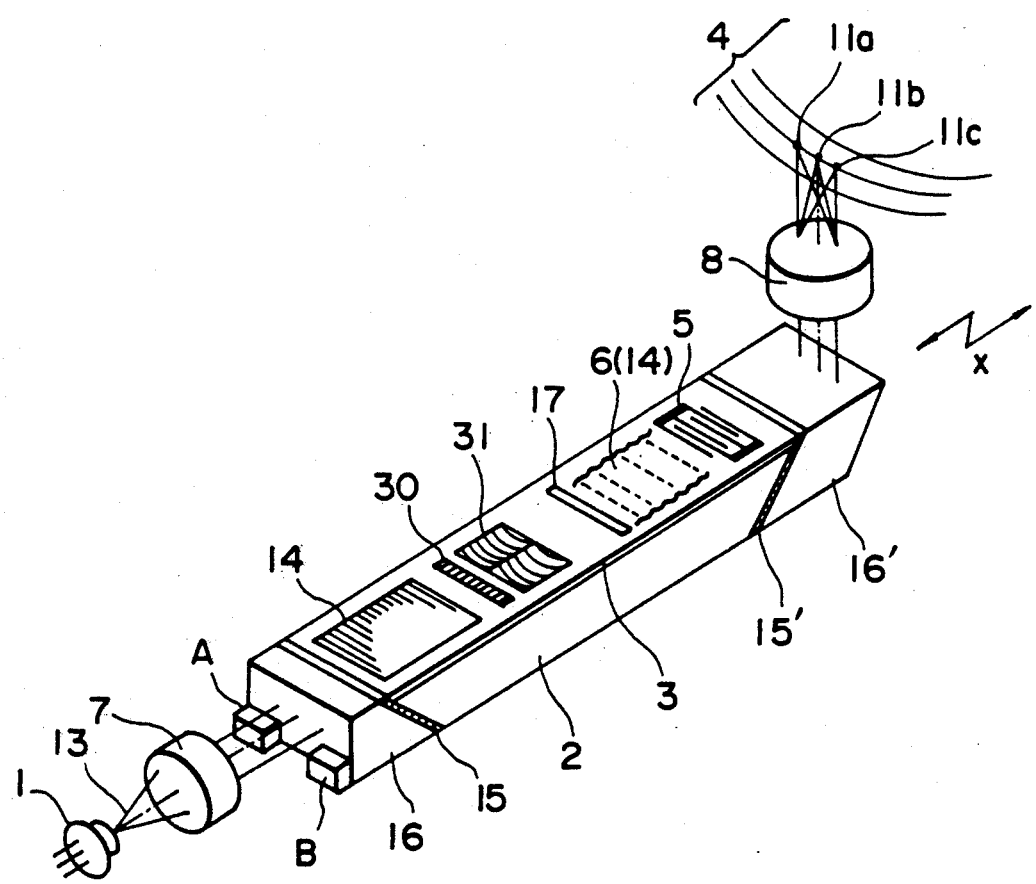
FIG. 1B is a schematic perspective view of a first example of an optical pickup suitable for use in the optical information processing apparatus of the first embodiment.

FIG. 1A shows one embodiment of optical information processing apparatus, and FIG. 1B shows one example of the optical pickup to be used in the apparatus.

The optical information processing apparatus comprises an optical pickup 100 for irradiating two or more light beams on the optical disk 4 and detecting the reflected light, a recording medium drive means 200 for moving the optical disk 4 relative to the optical pickup 100, a macro seek means 300 for varying the position at which the light beams are to be emitted from the optical pickup 100 to the optical disk 4, and a signal processing means 400 for processing a signal for performing the light beam control of the optical pickup 100 and information processing on the optical disk 4. Further, the apparatus includes a controller 500 for controlling each of the above means, and an interface 600 for transmitting and receiving data and the control signal to and from the external. The optical pickup 100, as shown in FIG. 1B, comprises: a semiconductor laser 1 as a light source; an optical waveguide layer 3 for guiding one light beam from the semiconductor laser 1; an SAW 6 (linear grating coupler 14) disposed in the optical waveguide layer 3 for deflecting the light beam, which runs in the optical waveguide layer 3, within a plane formed by a vector in the running direction of the light beam and a vector perpendicular to the general plane of the optical waveguide layer 3, based on a control signal from the signal processing means 400; an optical system for causing the light beam, which is outputted from the SAW 6, to strike on the optical disk 4 to form a light spot; and a set of sensors A, B for detecting reflected light from the optical disk 4.

A diffraction grating 15, for correcting fluctuation of wavelength, is disposed on the incidence end of the substrate 2, and a prism 16 is disposed outwardly of the diffraction grating 15. The sensors A, B are attached to the outside of the prism 16. Further, a coupling lens 7 is disposed between the semiconductor laser 1 and the prism 16.

On the emitting end of the substrate 2, a diffraction grating 15' for correcting fluctuation of wavelength, a prism 16', and an objective lens 8 are disposed, jointly constituting the optical system.

On the optical waveguide layer 3, SAW electrodes 5 for generating the SAW 6, an SAW absorbing plate 17, a focusing grating coupler 31, and a linear grating coupler 14 are disposed in this order from the emitting end.

The substrate 2 comprises, for example, LiNbO$_3$. The optical waveguide layer 3 is formed by diffusing Ti in LiNbO$_3$. Additionally using TiO$_2$, the linear grating coupler 14 is formed. With AM, the SAW electrodes 5 are produced. The material for each of these parts should by no means be limited to this illustrated embodiment. The same may be the of the following embodiments.

Though not shown in FIG. 1B, an exciter circuit 5a such as shown in FIG. 5 is connected to the SAW electrodes 5. The exciter circuit 5a is disposed, for example, in the optical pickup 100 or on a deflection angle control means 401 of a signal processing means 400. The same may be the of the following embodiments.

The recording medium drive means 200 is composed of a drive motor for rotating the optical disk 4, and a rotation control circuit for controlling the rotation of the optical disk 4, though either not shown.

The macro seek means 300 is composed of a drive mechanism for moving the optical pickup 100 radially of the optical disk 4, and a control circuit for controlling the movement of the optical pickup 100, though either not shown.

The signal processing means 400 is composed of a deflection angle control means 401 for obtaining a tracking error from a detection signal and controlling the deflection angle of the light beams in such a manner that the tracking error will be zero, a reproducing means 402 for reading, from the detection signal, information recorded on the tracks of the optical disk 4, an information recording means 403 for recording information on the optical disk 4, and a focusing control means 404 for performing focusing servo.

Figure 8A:
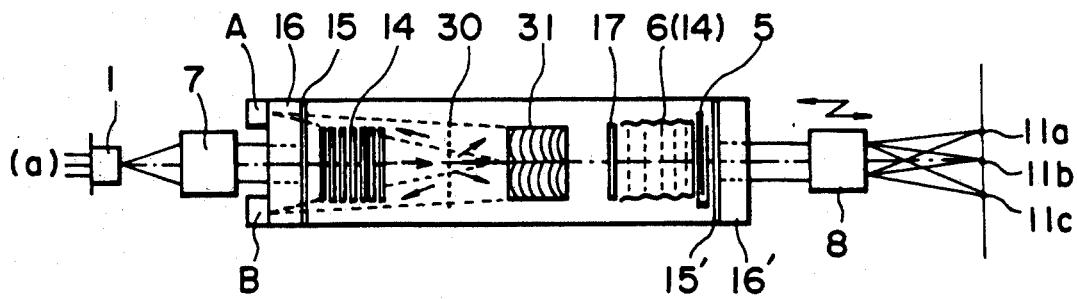
FIG. 8A is a plan view of the optical pickup of FIG. 1B according to the first example.
Figure 8B:
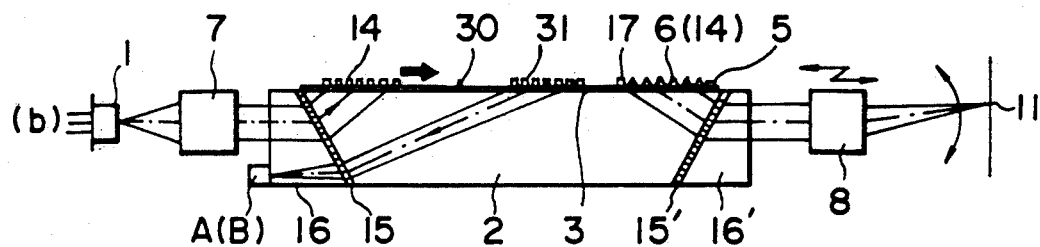
FIG. 8B is a side elevational view of the optical pickup of FIG. 1B according to the first example.

The operation of this embodiment will now be described. Here FIGS. 8A and 8B also are referred to show the construction also in plan and cross section. FIGS. 8A and 8B, though the light beams are emitted without being bent upwardly in the prism 16' for simplification of illustration, is not materially different from FIG. 1b.

The light emitted from the semiconductor laser 1 is collimated or converted into parallel light by the coupling lens 7 (or a collimater lens), and is then incident on the optical waveguide layer 3, which is formed on the substrate 2, via the linear grating coupler 14. The light beams 13, which are divided light as 0th order light ±1st order light by the diffraction grating 30 in order to form three light spots, and are emitted toward the substrate 2 by the SAW 6 generated between the SAW electrodes 5 and the SAW absorbing plate 17, thus forming a light spot 11$b$, for recording and reproducing information, and two light spots 11$a$, 11$c$, for tracking, on the optical disk substrate 4 via the objective lens 8.

The information on the optical disk substrate 4, as reflected light, runs through the objective lens 8, the prism 16' and the diffraction grating 15' for correcting fluctuation of wavelength, is then incident on the optical waveguide layer 3 again via the SAW 6, is emitted toward the substrate 2 by the focusing grating coupler 31, and is finally focused on the sensors A, B, each composed of a quartered element.

The light spots 11$a$, 11$b$, 11$c$ are inclined to a track 12, as shown in FIG. 10, by somewhat inclining the entire optical system. By varying the frequency of an a.c. voltage to be applied to the SAW electrodes 5, the light spots 11$a$, 11$b$, 11$c$ can be scanned at the same time, enabling high-speed micro seek and tracking control.

Figure 9:
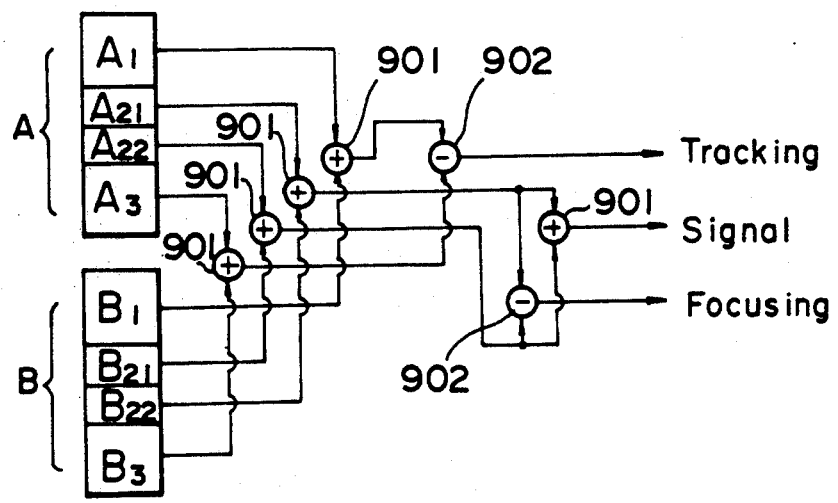
FIG. 9 is a wiring diagram showing sensor elements and an operational circuit which are suitable for use in the optical pickup of the invention.

The sensors A, B are composed of a plurality of sensing elements, comprising two quartered elements as shown in FIG. 9. Of return light, the light spot 11$a$ is focused on an image element $A_3$ of the sensor A and an image element $B_3$ of the sensor B; the light spot 11$b$, on image elements $A_{21}$, $A_{22}$ of the sensor A and image elements $B_{21}$, $B_{22}$ of the sensor B; and the light spot 11$c$, on an image element $A_1$ of the sensor A and an image element $B_1$ of the sensor B.

Accordingly, in tracking, by the three-spot method the frequency of the voltage to be applied to the SAW electrodes 5 is controlled by the deflection angle control means 401 in such a manner that the sum of outputs of the image elements $A_1$, $B_1$ is equal to the sum of outputs of the image elements $A_3$, $B_3$. In focusing, by the Foucault method an electric coil for moving the objective lens 8 axially thereof is controlled in such a manner that the sum of outputs of the image elements $A_{21}$, $B_{22}$ is equal to the sum of outputs of the image elements $A_{22}$, $B_{21}$.

The outputs of the sensors A, B, as shown in FIG. 9, are calculated by an adder circuit 901 and a subtracter circuit 902, respectively obtaining a tracking error signal, a focusing signal and a reproducing signal. The adder circuit 901 and the subtracter circuit 902 are disposed in the signal processing means 400. Alternatively, they may be located in the optical pickup 100.

In the first example, macro seek is performed by sliding the entire optical system of FIG. 1B in the direction of x by an actuator, namely, the macro seek means 300 of FIG. 1A.

Figure 2:
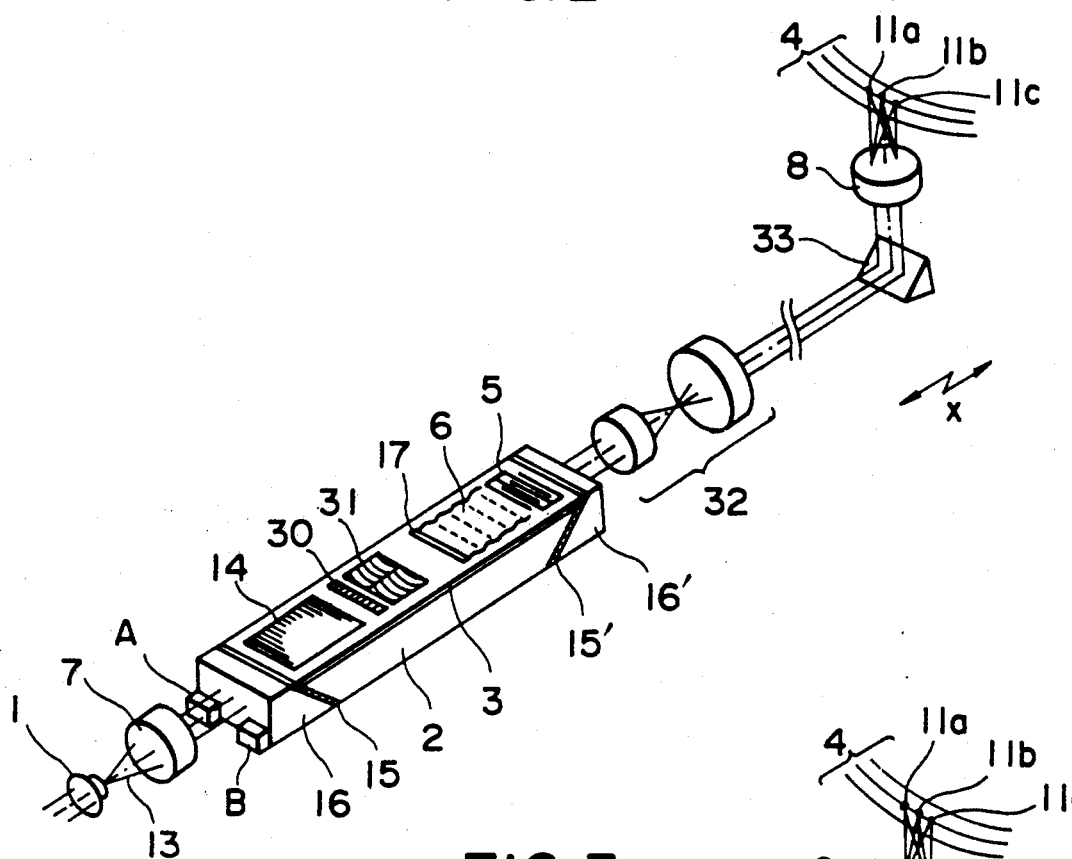
FIG. 2 is a schematic perspective view similar to FIG. 1B, showing a second example of the optical pickup.

In the second example of FIG. 2, unlike the first example, the semiconductor laser 1 to a relay lens system 32 are fixed, and the movable part 40 composed of the objective lens 8 and a mirror 33 is slid, so that macro seek time is minimized by reducing the weight of the movable part. The construction of the optical system up to the prism 16' is identical with that of FIG. 1.

Figure 3:
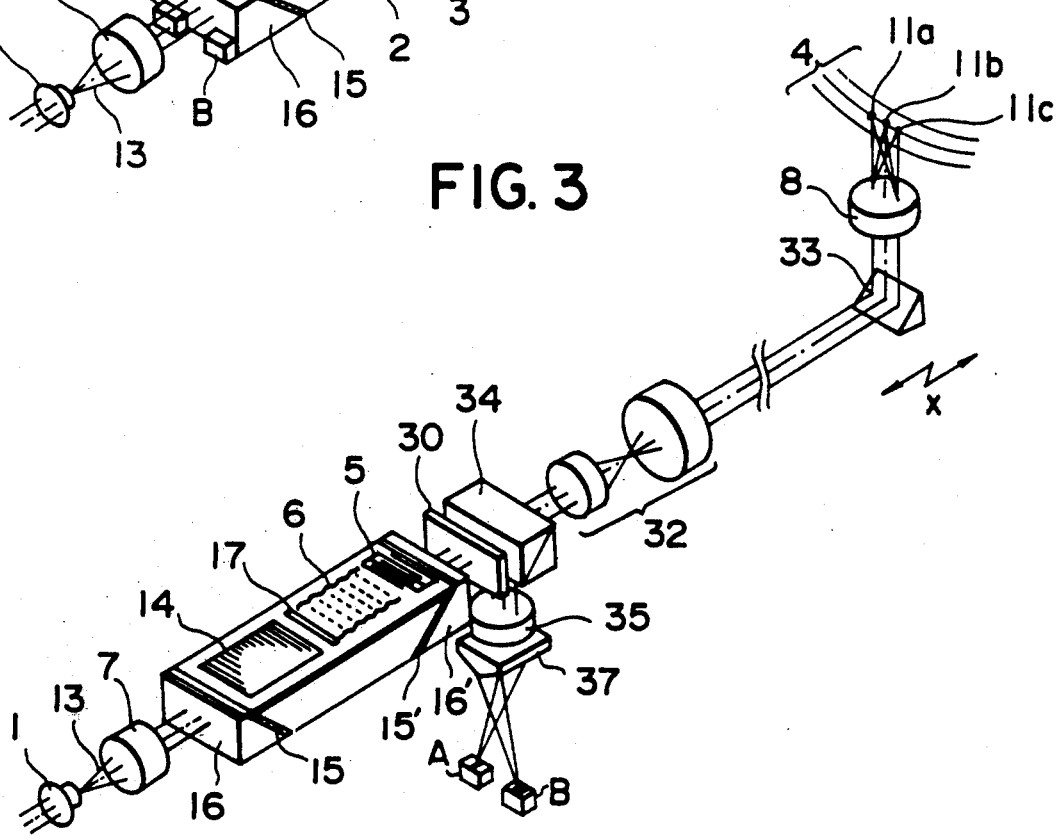
FIG. 3 is a schematic perspective view similar to FIG. 1B, showing a third example of the optical pickup.

FIG. 3 shows a third example, in which return light from the optical disk 4 is detected by the external sensors A, B, without being returned to the optical waveguide layer 3.

The light beams 13 emitted from the semiconductor laser 1 run through the prism 16, the diffraction grating 15 for correcting fluctuation of wavelength, and linear grating coupler 14 and then strike on the optical waveguide layer 3, whereupon the light beams 13 are deflected by the SAW 6 when being emitted from the optical waveguide layer 3.

In FIG. 3, 30 designates a diffraction grating, which may be disposed on the optical waveguide layer 3, for forming three light spots; and 34, a light beam splitter so that the light from the diffraction grating 30 pass through the relay lens system 32, the mirror 33 and the objective lens 8 and then strike on the optical disk 4 to form light spots 11$a$, 11$b$, 11$c$.

The return light is bent by the light beam splitter 34, passes through a focusing lens 35 and a prism 37, and is detected by the sensors A, B. Each of the sensors A, B is a quartered sensor for performing tracking by the three-spot method like FIG. 9 and for performing focusing by the Foucault's method.

In the first, second and third examples, the light emission from the optical waveguide layer 3 may be toward either the substrate 2 or the atmosphere. Each of the objective lens 8 and the coupling lens 7 may be in the form of either a diffraction grating or a wave directing lens formed on the optical waveguide layer 3. The deflecting function using the SAW may be substituted by the electro-optical effect such as of FIG. 7.

In the foregoing embodiment, the three-spot method is employed. If the semiconductor laser 1 is substituted by the multi-beam type having plural emitting points arranged in parallel to the optical waveguide layer 3, it is possible to provide an optical system suitable for performing recording, erasing, reproducing, etc. with the individual light beams. The detecting system in part may also be modified so as to meet with the phase-varying type and opto-magnetic type. Further, the tracking method and focusing method may be substituted by the push-pull method, the sample servo method, etc.

The the multi-beam type light source may be the one shown in FIG. 19, which is used in the example described below.

According to the foregoing embodiment, since the optical waveguide provided with, for example, the SAW (Surface Acoustic Wave) coupler light deflector is used to integrate various optical elements, three light beams can be controlled by a single substrate. This reduces the weight of the optical pickup to facilitate accessing near a desired track, minimizing the access time and realizing information processing, i.e. reproducing and/or recording information on the optical recording medium with high precision and reliableness.

In addition, when using plural light spots which enables tracking, recording, erasing, reproducing or quickly-after-recording reproducing with improved precision, the plural light spots can be simultaneously deflected at high speed to reduce micro seek time and hence access time of, for example, the optical disk unit.

An optical information processing apparatus according a second embodiment of this invention will now be described. The apparatus of the second embodiment is small-sized and inexpensive, and is most suitable for improving the transfer speed by performing recording, reproducing or erasing information on plural tracks of an optical disk in parallel.

The fundamental construction of the optical information processing apparatus is similar to that of FIG. 1A, except that each of the reproducing means 402 and the information recording means 403 is capable of performing the process for plural channels and plural light beams. The optical pickup is partly different from that of FIG. 1A.

In the second embodiment, while plural light spots for inputting or outputting information are being formed and arranged linearly at an angle to the tracks by a single optical system, these light spots are controlled in tracking and focusing at the same time.

Figure 17:
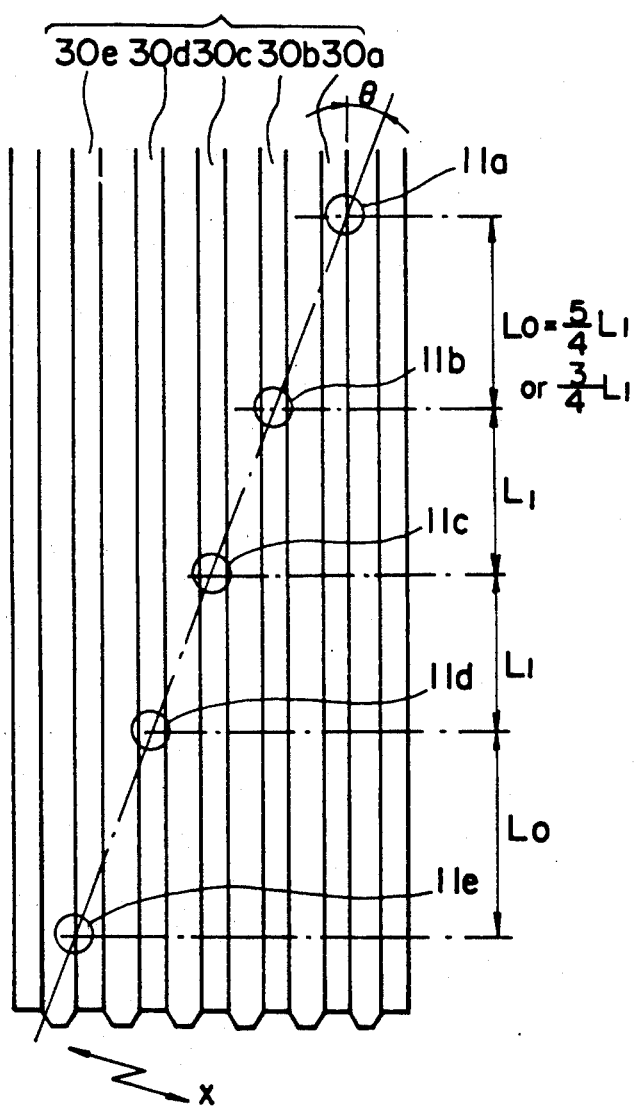
FIG. 17 is a diagram showing the positional relationship between light spots and tracks according to the first embodiment using plural light emitting elements.

In an optical disk, partly since adjacent tracks are spaced at substantially uniform distance, and partly since the diameter of the disk is sufficiently large, compared to the intertrack distance, the individual tracks can be locally regarded to be straight. For example, as shown in FIG. 17, by arranging the light spots 11b, 11c, 11d linearly on a row and inclining the line spot row by a small angle H with respect to the tracks 30, it is possible to form each of the light spots 11b, 11c, 11d on the respective track 30d, 30c, 30d at a position spaced a constant distance L1 from the adjacent light spot. This relationship is kept substantially constant throughout the inner and outer peripheral edges of the optical disk.

With the distances between the light spots 11b, 11c, 11d kept constant all the time, if tracking and focusing are performed at the same time, and the individual light spots are controlled in quantity independently, it is possible to record, reproduce or erase the information in parallel by using a simple optical system.

In the embodiment of FIG. 17, instead of the three-spot method, two auxiliary light spots 11a, 11e are provided on the extension of the row of light spots 11b, 11c, 11d independently thereof, and the distance between the light spots 11a, 11b and between the light spots 11d, 11e is $L_0 (= \frac{3}{4} L_1$ or $5/4 L_1$) in such a manner that these auxiliary light spots 11a, 11b deviates from the tracks 30a, 30e, respectively, by about a ¼ pitch.

Various examples of the optical pickup suitable for use in the second embodiment will now be described.

Figure 13:
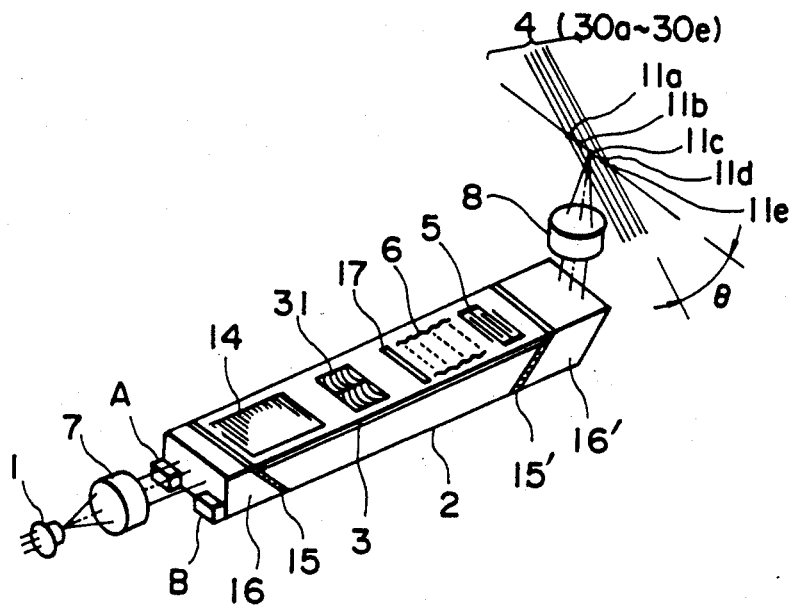
FIG. 13 is a schematic perspective view similar to FIG. 1B, showing a fourth example of the optical pickup.
Figure 18A:
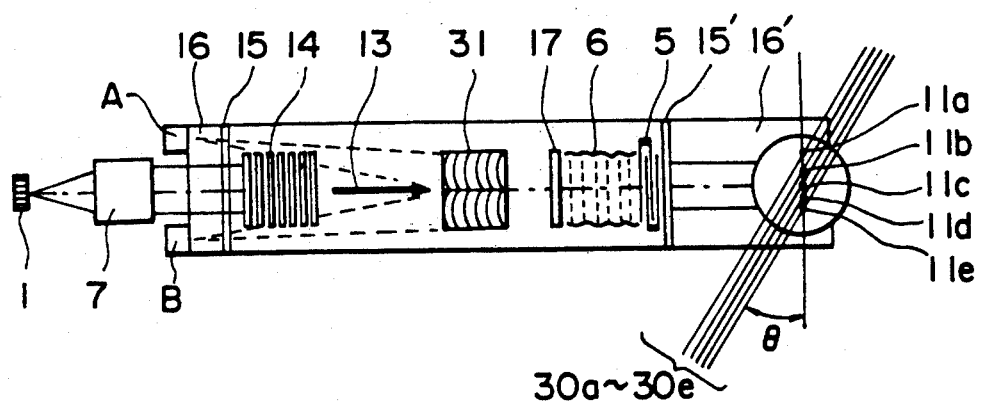
FIG. 18A is a plan view of the optical pickup according to the fourth example.
Figure 18B:
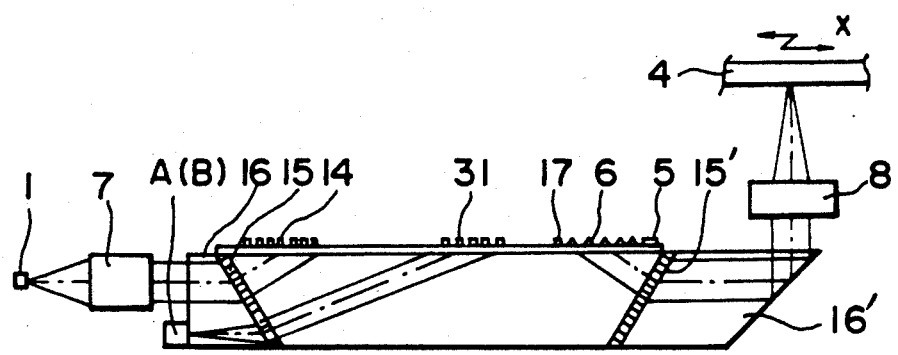
FIG. 18B is a side elevational view of FIG. 18B.

FIGS. 13, 18A and 18B show a fourth example, in which the optical pickup is equipped with a linear grating coupler using an SAW.

The light beams emitted from the semiconductor laser 1 composed of plural elements are collimated by the coupling lens 7 (or a collimeter lens), then pass through the prism 16, the diffraction grating 15, for correcting fluctuation of wavelength, and the linear grating coupler 14, and strike on the optical waveguide layer 3 formed on the substrate 2. The light beams are emitted from the optical waveguide 3 toward the substrate 2 by the SAW 6 produced between the SAW electrodes 5 and the SAW absorbing plate 17, pass through the diffraction grating 15' for correcting fluctuation of wavelength, the prism 16' and the objective lens 8, and form on the optical disk 4 three light spots 11b, 11c, 11d for recording and reproducing (inputting and outputting) information and two light spots 11a, 11e for tracking.

The information on the optical disk 4, as reflected light, passes through the objective lens 8, the prism 16' and the diffraction grating 15' for correcting fluctuation of wavelength, then is incident on the optical waveguide layer 3 again via the SAW 6, is emitted from the optical waveguide layer 3 toward the substrate by the focusing grating coupler 31, and is finally focused on the sensors A, B.

As the whole optical system is inclined by a small angle $\theta$, the light spots 11a–11e are located on adjacent plural tracks 30a–30e, respectively, as shown in FIG. 17. Further, as the frequency of an a.c. voltage to be applied to the SAW electrodes 5 is varied, the light spots can be simultaneously scanned substantially perpendicularly (i.e., the direction of x) to the tracks, and high-speed micro seek and tracking can be controlled.

Figure 19:
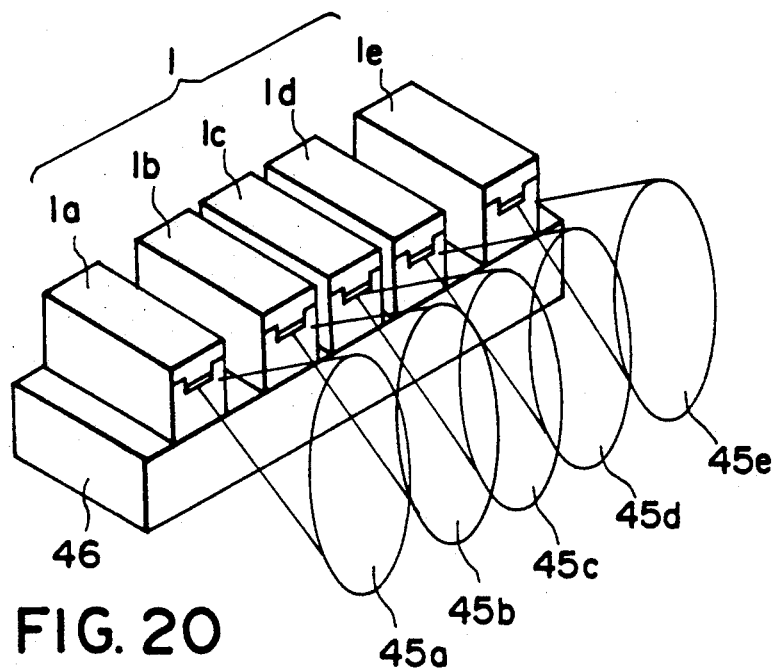
FIG. 19 is a perspective view of semiconductor lasers suitable for use in the optical pickup of the invention.

FIG. 19 shows the detailed construction of the semiconductor laser 1. Corresponding to the relative positions of the light spots 11a, 11b, 11c, 11d, 11e, the semiconductor lasers 1a, 1b, 1c, 1d, 1e are supported on the substrate 46 at suitable spaces for generating light beams 45a, 45b, 45c, 45d, 45e, respectively.

Figure 20:
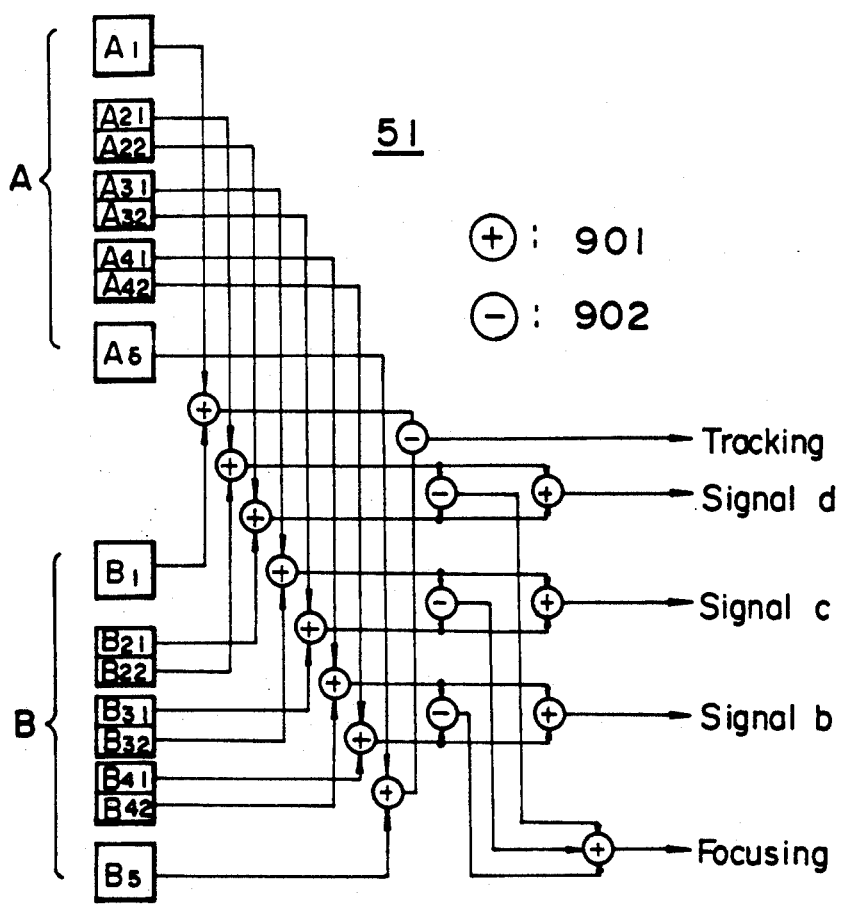
FIG. 20 is a wiring diagram showing sensor elements and an operational circuit which are suitable for use in the optical pickup of the invention.

The individual sensor A, B is composed of a multi-split element, as shown in FIG. 20. Of return light, the light spot 11a is focused on an image element $A_5$ of the sensor A and an image element $B_5$ of the sensor B; the light spot 11b, on image elements $A_{41}$, $A_{42}$ of the sensor A and image elements $B_{41}$, $B_{42}$ of the sensor B; the light spot 11c, on image elements $A_{31}$, $A_{32}$ of the sensor A and image elements $B_{31}$, $B_{32}$ of the sensor B; the light spot 11d, on image elements $A_{21}$, $A_{22}$ of the sensor A and image elements $B_{21}$, $B_{22}$ of the sensor B; and the light spot 11e, on an image element $A_1$ of the sensor A and an image element $B_1$ of the sensor B. Therefore, in tracking, like the conventional three-spot method, the frequency of a voltage to be applied to the SAW electrodes is controlled in such a manner that the sum of outputs of the image elements $A_1$, $B_1$ is equal to the sum of outputs of the image elements $A_5$, $B_5$.

In focusing, by the Foucault's method an electric coil for moving the objective lens axially thereof is controlled in such a manner that the sum of outputs of the image elements $A_{i1}$, $B_{i2}$ is equal to the sum of outputs of the image elements $A_{i2}$, $B_{i2}$ ($i=2, 3, 4$). In this focusing, for minimizing influences of inclination of the optical disk, a mean value of signals obtained from three light spots is used.

Information signals can be obtained from the sum of outputs of four image elements. In this embodiment, only parallel reproducing is discussed. Alternatively, using the light spots 11a, 11e, focusing may be controlled by the Foucault's method to control the outputs of the light spots 11b, 11c, 11d so that information can be recorded, reproduced or erased in parallel.

Also in this embodiment, as shown in FIG. 20, an adder circuit 901 and a subtracter circuit 902 are used.

Figure 21:
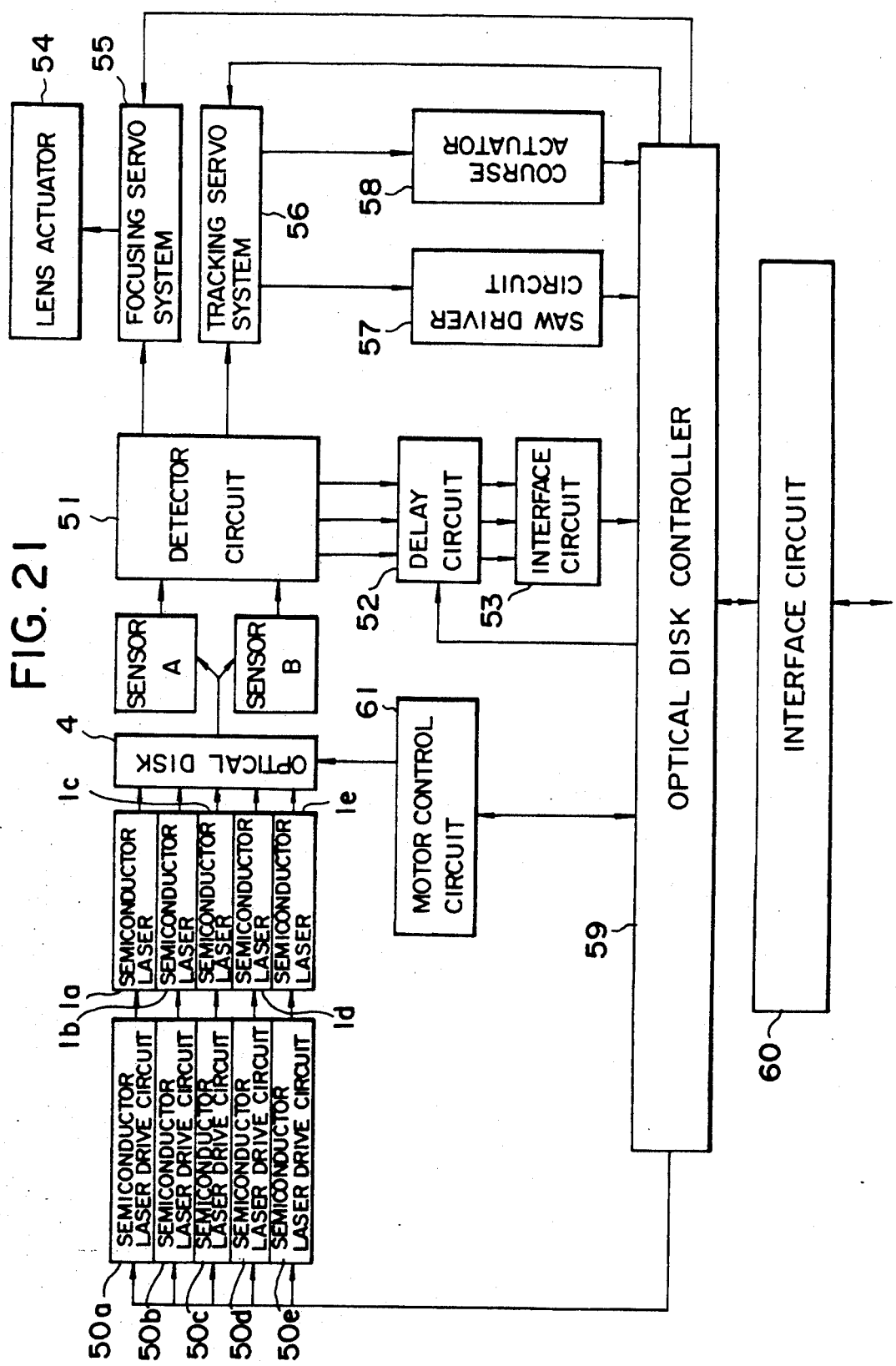
FIG. 21 is a block diagram of a control circuit according to a second embodiment of the invention.

FIG. 21 shows the detailed construction of the control circuit used in the second embodiment.

The outputs of the semiconductor lasers 1a-1e are controlled respectively by semiconductor laser driving circuits 50a-50e. The reflected light from the optical disk is detected by the sensors A, B and is transferred to a detector circuit 51 of FIG. 20. Designated by 61 in FIG. 21 is a motor control circuit for rotating the optical disk.

A focusing signal energizes a lens actuator 54 via a focusing servo system 55. Meanwhile, a tracking signal controls an SAW driver circuit 57, for micro seek and tracking, and a course actuator 58, for macro seek, via a tracking servo system 56.

Information signals are transferred to an optical disk controller 59 via a delay circuit 52, for compensating a delay occurred between the tracks, and an interface circuit 53. The information signals are further transferred to various kinds of processing apparatus via an interface circuit 60.

In the fourth example, macro seek is conducted by sliding the whole optical system of FIG. 13 in the direction of x by the course actuator 58.

Figure 14:
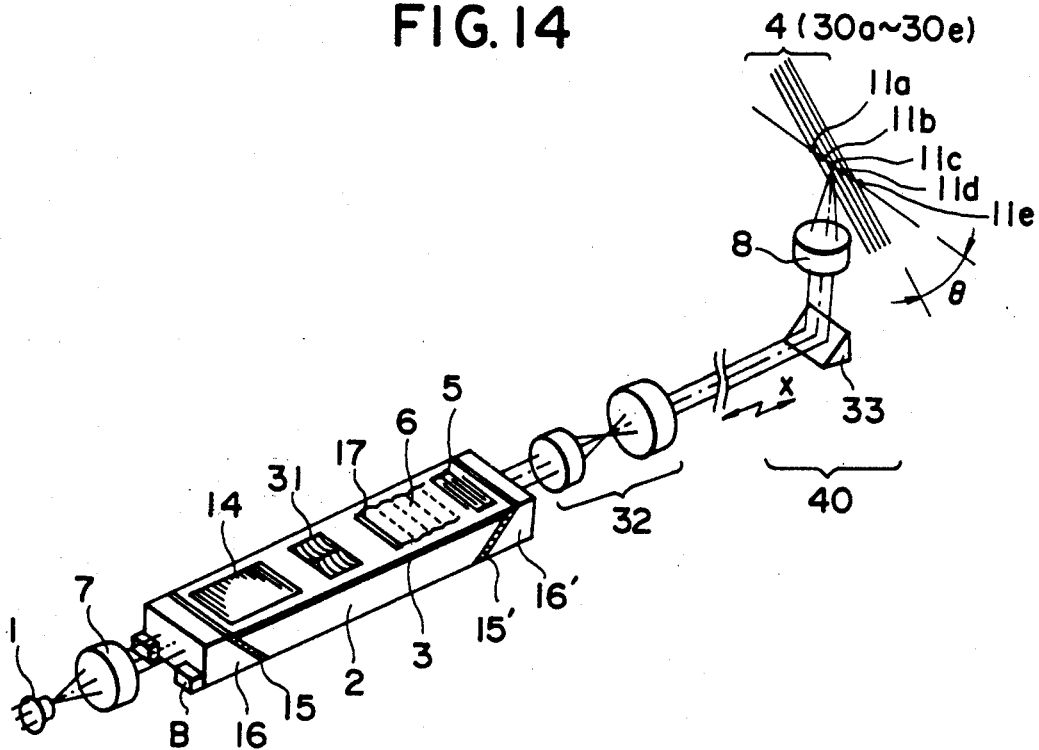
FIG. 14 is a schematic perspective view similar to FIG. 1B, showing a fifth example of the optical pickup.

In the fifth example of FIG. 14, with the semiconductor laser 1 to the relay lens system 32 being fixed, the movable part 40 composed of only the object lens 8 and the mirror 33 in the direction of x so that macro seek time can be minimized by the reduced weight of the movable part. Here in this example, the construction of the optical system up to the prism 16' is identical with that of FIG. 13.

Figure 15:
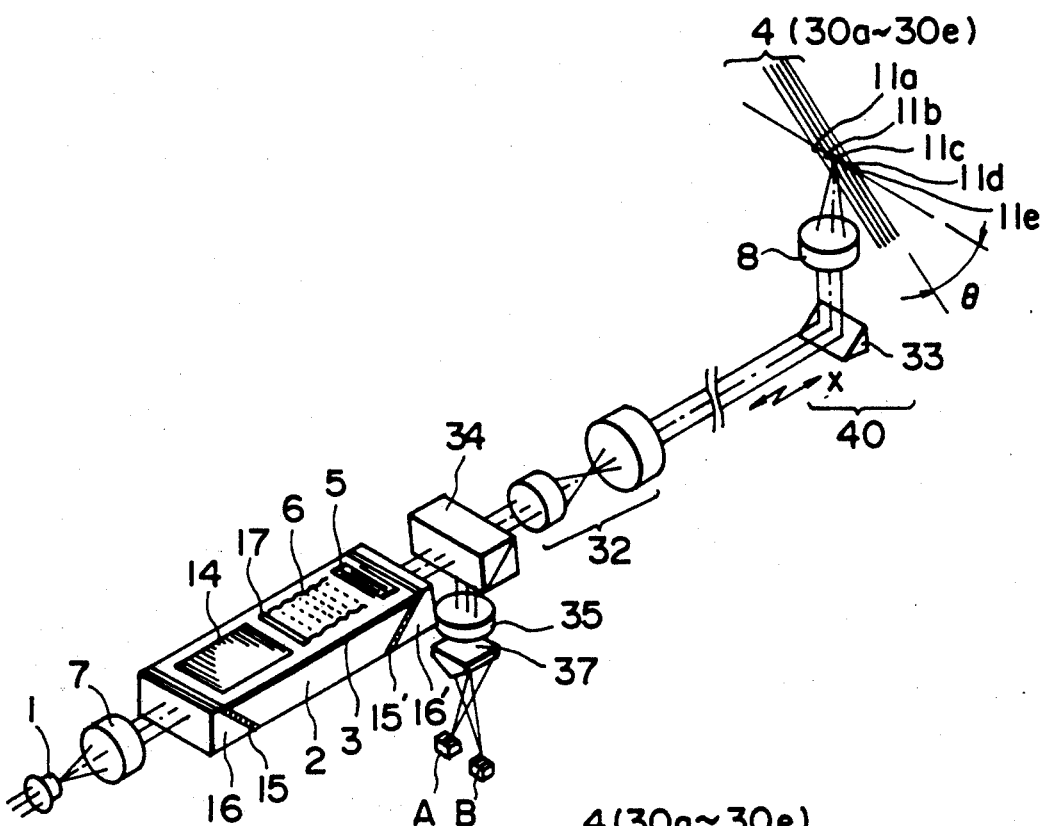
FIG. 15 is a schematic perspective view similar to FIG. 1B, showing a sixth example of the optical pickup.

In the sixth example, as shown in FIG. 15, the return light from the optical disk 4 is detected by the external sensors A, B, without being return to the optical waveguide layer 3. The light from the semiconductor laser 1 composed of plural elements is incident on the optical waveguide layer 3 via the coupling lens 7 and the prism 16 and the diffraction grating, for correcting fluctuation of wavelength, and is deflected by the SAW 6 during emitting. In FIG. 15, reference numeral 34 designates a light beam splitter so that the light passes through the relay lens system 32, the mirror 33 and the objective lens 8 and then strikes on the optical disk 4 to form light spots 11a-11e thereon. The return light is bent by the beam splitter 34, passes through the focusing lens 35 and the prism 37, and is detected by the sensors A, B. Each of the sensors A, B is a multi-split sensor which is capable of tracking by the three-spot method like the example of FIG. 20, and of focusing by the Foucault's method.

In the fourth to sixth examples, the light spots emitted from the optical waveguide layer 3 may be toward either the substrate or the atmosphere. The objective lens 8 and the coupling lens 7 also may be either in the form of a diffraction grating or in the form of a wave directing lens formed on the optical waveguide layer 3. The deflecting function using SAW may be substituted by the one utilizing the electro-optical effect such as shown in FIG. 7.

Figure 16:
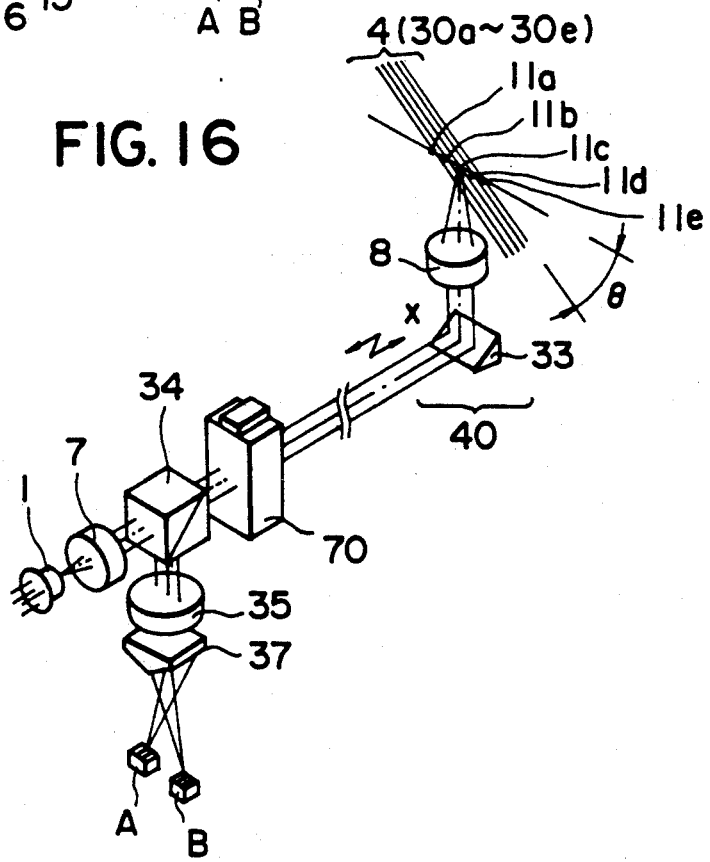
FIG. 16 is a schematic perspective view similar to FIG. 1B, showing a seventh example of the optical pickup.

FIG. 16 shows a seventh example using an optical waveguide.

The light from the semiconductor laser 1 composed of plural elements passes through the coupling lens 7 and the beam splitter 34, is deflected by an acousto-optical element 70 as a bulk element, passes through the mirror 33 and the objective lens 8, and strikes on the optical disk to form light spots 11a-11e. The return light passes through the acousto-optical element 70, is bent by the beam splitter 34, then passes through the focusing lens 35 and the prism 37, and is detected by the sensor A, B. Each of the sensors A, B is a multi-split sensor which is capable of tracking by the three-spot method like the example of FIG. 20 and focusing by the Foucault's method.

In each of the foregoing examples, since deflection of light is performed without using a mechanical means, it is possible to control high-speed tracking.

Further, in each example, three light spots are used in order to obtain information signals, and the number of the light spots should by no means be limited to three but may be two or more.

Figure 23:
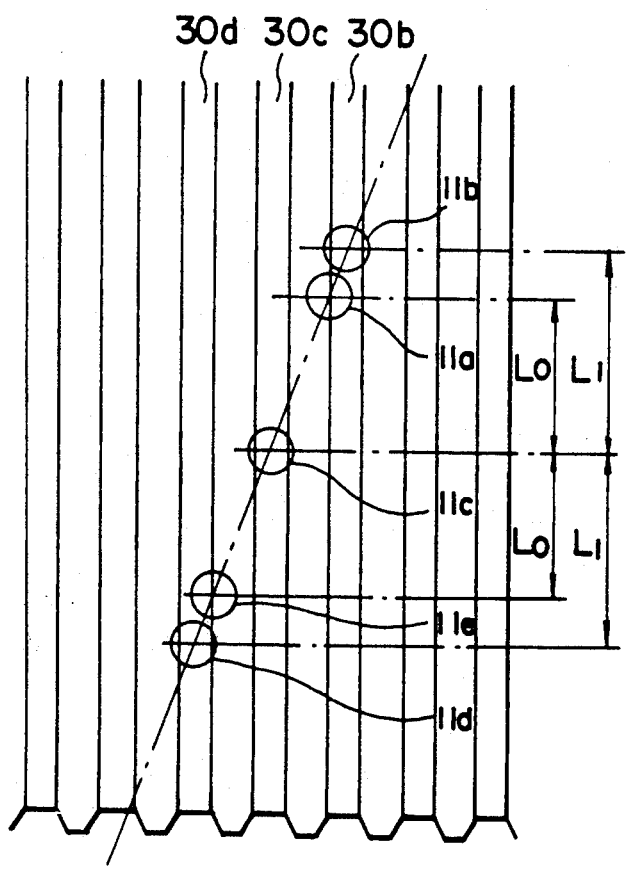
FIG. 23 is a diagram showing the positional relationship between light spots and tracks according to the second embodiment.

When using for example the sample servo method in tracking, the light spots 11a, 11e, for tracking, used in the fourth to seventh examples may be omitted or may be used to perform focusing. Also the light spots for tracking, as shown in FIG. 23, may be located between the light spots 11b, 11c, 11d for information in the manner like the light spots 11a, 11e. The detecting system in part may also be modified so as to meet with the phase-varying type and opto-magnetic type.

The light emitting elements of the light source may be lasers other than semiconductor lasers, or other emitting elements.

Figure 22:
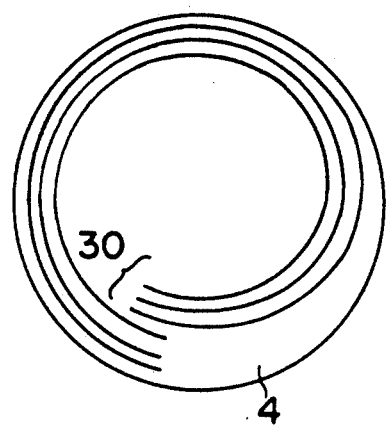
FIG. 22 is a diagram showing an optical disk having plural spiral tracks.

Generally, tracks of an optical disk is in the form of a single spiral track. For an alternative form, as shown in FIG. 22, plural tracks 30 may be provided on the optical disk 4 spirally, which are suitable in parallel recording, reproducing or erasing. In addition, the tracks may be provided on an optical drum.

As mentioned above, according to the fourth to seventh examples, since plural light spots are simultaneously formed on an optical disk by using a small-sized inexpensive optical system to perform simultaneous parallel recording, reproducing or erasing, it is possible to increase the transfer speed of information.

What is claimed is:

1. An optical information processing apparatus for performing information process on an optical recording medium having tracks on which information is to be recorded, said apparatus comprising:
   (a) an optical pickup for irradiating plural light beams to the recording medium and for detecting reflected light of the light beams;
   (b) a recording medium drive means for moving the recording medium relative to said optical pickup; and
   (c) a signal processing means for controlling the light beams of said optical pickup and for performing information process on the recording medium;
   (d) said optical pickup including at least one light source, an optical waveguide for guiding the light beams from said light source, a light deflecting element disposed in said optical waveguide for controllaby deflecting the light beams running in said optical waveguide, within a plane formed by a vector in that running direction and a vector perpendicular to a plane of said optical waveguide, based on a control signal from said signal processing means, an optical system for focusing the light beams, which are outputted from said light deflecting element, on the recording medium to form light spots, and sensor elements for detecting the reflected light from the recording medium.

2. An optical information processing apparatus according to claim 1, wherein said optical pickup includes means for generating the plural light beams.

3. An optical information processing apparatus according to claim 2, wherein said light beam generating means is composed of plural light emitting elements as said light source.

4. An optical information processing apparatus according to claim 2, wherein said light beam generating means includes means for dividing one light beam, which is emitted from said light source, into plural light beams.

5. An optical information processing apparatus according to claim 4, wherein said light source is a semiconductor laser as a light emitting element.

6. An optical information processing apparatus according to claim 4, wherein said light deflecting element includes means for forming a linear grating coupler from said optical waveguide by propagating a surface acoustic wave to said optical waveguide.

7. An optical information processing apparatus according to claim 6, wherein said linear grating coupler forming means is located so as to propagate the surface acoustic wave substantially in parallel to the running direction of the light beams.

8. An optical information processing apparatus according to claim 4, wherein said light deflecting element includes a linear grating coupler disposed on said optical waveguide, and means for generating an electric field in said optical waveguide to control an emitting angle of the light beams from the linear grating coupler.

9. An optical information processing apparatus according to claim 3, wherein said plural light emitting elements are arranged in such a manner that the light beams to be emitted to the recording medium form light spots in a row on the recording medium.

10. An optical information processing apparatus according to claim 9, wherein said optical pickup is located in such manner that the individual light spots are formed on adjacent tracks and that the row of the light spots is disposed at an angle to the track.

11. An optical information processing apparatus according to claim 9, wherein each of said plural light emitting elements is a semiconductor laser.

12. An optical information processing apparatus according to claim 10, wherein said light deflecting element includes means for forming a linear grating coupler from said optical waveguide by propagating a surface acoustic wave to said optical waveguide.

13. An optical information processing apparatus according to claim 12, wherein said linear grating coupler forming means is located so as to propagate the surface acoustic wave substantially in parallel to the running direction of the light beams.

14. An optical information processing apparatus according to claim 10, wherein said light deflecting element includes a linear grating coupler disposed on said optical waveguide, means for generating an electric field in said optical waveguide to control an emitting angle of the light beams from the linear grating coupler.

15. An optical information processing apparatus according to claim 9, wherein said light deflecting element is an acousto-optical element.

16. An optical information processing apparatus according to claim 9, wherein said optical pickup is capable of generating, in addition to the light beams for inputting and outputting information, two auxiliary light beams, the distance between light spots formed by the auxiliary light beams and the light spots formed by the light beams for inputting and outputting information being different a quarter from the distance between the light beams for inputting and outputting information.

17. An optical information processing apparatus according to claim 1, wherein the light deflecting element is a single light deflecting element, the optical system enabling formation of plural light spots extending in a row direction on the recording medium, the single light deflecting element being controlled so as to control the deflection of the light beams and enable movement of the plural light spots in a direction transverse to the row extension direction thereof.

18. An optical information processing apparatus according to claim 17, wherein at least three light beams form at least three light spots extending in the row direction on the recording medium, the at least three light spots being adjacent one another and being positionable on at least three adjacent tracks of the recording medium.

19. An optical information processing apparatus according to claim 17, wherein the optical pickup includes plural light generating elements as the light source for generating respective ones of the plural light beams.

20. An optical pickup for an optical information processing apparatus for performing information process on an optical recording medium having tracks on which information is to be recorded, said optical pickup comprising:
(a) at least one light source;
(b) an optical waveguide for guiding plural light beams from said light source;
(c) a transparent substrate for supporting said optical waveguide;
(d) a light deflecting element for controllably deflecting the light beams, which run in said optical waveguide, so as to strike on said transparent substrate, based on a control signal from the information processing apparatus;
(e) an optical system for focusing the deflected light beams as light spots on the recording medium; and
(f) sensor elements for detecting reflected light of the light beams from the recording medium.

21. An optical pickup according to claim 20, wherein said optical waveguide is in the form of a layer on said tranparent substrate,
said light deflecting element including an exciter circuit for generating an exciting voltage having a frequency commensurate with the control signal, and an electrode disposed in said layer for generating a surface acoustic wave upon application of the exciting voltage and for propagating the surface acoustic wave in the running direction of the light beams, whereby an emitting angle of the light beams to transparent substrate is controlled according to the frequency of the exciting voltage applied to said electrode.

22. An optical pickup according to claim 20, wherein said optical waveguide is in the form of a layer on said transparent substrate,
said light deflecting element including a linear grating coupler disposed on said optical waveguide, an electrode for generating an electric field in said optical waveguide, and a voltage application circuit for applying an voltage to said electrode, whereby an emitting angle of the light beams to said transparent substrate is controlled according to the voltage applied to said electrode.

23. An optical pickup according to claim 21, wherein said light source includes plural light emitting elements which are able to be driven independently, whereby the plural light beams from said light emitting elements are introduced into said optical waveguide.

24. An optical pickup according to claim 22, wherein said light source includes plural light emitting elements which are able to be driven independently, whereby the plural light beams from said light emitting elements are introduced into said optical waveguide.

25. An optical information processing apparatus according to claim 20, wherein the light deflecting element is a single light deflecting element, the optical system enabling formation of plural light spots extending in a row direction on the recording medium, the single light deflecting element being controlled so as to control the deflection of the light beams and enable movement of the plural light spots in a direction transverse to the row extension direction thereof.

26. An optical information processing apparatus according to claim 20, wherein at least three light beams form at least three light spots extending in the row direction on the recording medium, the at least three being adjacent one another and light spots being positionable on at least three adjacent tracks of the recording medium.

27. An optical information processing apparatus according to claim 20, wherein the optical pickup includes plural light generating elements as the light source for generating respective ones of the plural light beams.

28. A method of tracking in an optical information processing apparatus, comprising:
(a) generating at least one first light beam for inputting and outputting information, and one or more second light beams for tracking;
(b) introducing the first and second light beams into a light waveguide;
(c) deflecting by a light deflecting element the first and second light beams, which run in said optical waveguide, within a plane formed by a running direction of the first and second light beams and a normal to a plane of said optical waveguide;
(d) irradiating the deflected first and second light beams to the recording medium via an optical system to form light spots on the recording medium;
(e) branching, from the optical system, the light beams struck on the optical system as reflected from the light spot;
(f) detecting the branched light beam by sensor elements;
(g) obtaining a tracking error signal from a detection signal concerning the second light beams; and
(h) varying a deflection angle of the light deflecting element according to the tracking error signal in such a manner that the tracking error signal is zero.

29. A tracking method according to claim 28, wherein said deflecting is performed by propagating a surface acoustic wave to the optical waveguide in parallel to the running direction of the light beams, and the deflection angle is determined by varying the frequency of the surface acoustic wave according to the tracking error signal.

30. A tracking method according to claim 28, wherein said deflecting is performed by irradiating the light beams to the transparent substrate through a linear grating coupler disposed on the optical waveguide, and the deflection angle is determined by generating an electric field in the running direction of the light beams in the optical waveguide and by varying the intensity of the field according to the tracking error signal.

31. A tracking method according to claim 28, wherein the light deflecting element is a single light deflecting element, the optical system enabling the formation of plural light spots extending in a row direction on the recording medium, and varying a deflection angle of the light deflecting element controls the deflection of the light beams and enable movement of the light spots in a direction transverse to the row extension direction thereof.

32. A tracking method according to claim 28, wherein the at least one of the first and second light beams include at least three light beams forming at least three light spots extending in the row direction on the recording medium and being adjacent one another, the at least three adjacent light spots being positionable on at least three adjacent tracks of the recording medium.

33. A tracking method according to claim 28, wherein the step of generating includes utilizing plural light generating elements for generating respective ones of the first and second light beams.

34. A method of forming light spots in an optical information processing apparatus for performing information process on an optical recording medium having tracks on which information is to be recorded, said method comprising:
(a) emitting plural light beams from a light source in response to recordation or reproduction of information;
(b) introducing the light beams from the light source into a flat optical waveguide;
(c) deflecting by a deflecting element the light beams, which run in the optical waveguide, within a plane formed by a vector of the running direction of the light beams and a plane vector of the optical waveguide; and
(d) irradiating the deflected light beams to the recording medium via an optical system.

35. A light spot forming method according to claim 34, wherein said deflecting is performed by propagating a surface acoustic wave to the optical waveguide in parallel to the running direction of the light beams, and the deflection angle is determined by varying the frequency of the surface acoustic wave according to the tracking error signal.

36. A light spot forming method according to claim 34, wherein said deflecting is performed by irradiating the light beams to the transparent substrate through a linear grating coupler disposed in the optical waveguide, and the deflection angle is determined by generating an electric field in the running direction of the light beams in the optical waveguide and by varying the intensity of the field according to the tracking error signal.

37. A method according to claim 34, wherein the light deflecting element is a single light deflecting element, the deflected light beams enabling the formation of plural light spots extending in a row direction on the recording medium, and varying a deflection angle of the light deflecting element to control the deflection of the light beams and enable movement of the light spots in a direction transverse to the row extension direction thereof.

38. A method according to claim 34, wherein the plural light beams include at least three light beams forming at least three light spots extending in the row direction on the recording medium and being adjacent one another, the at least three adjacent light spots being positionable on at least three adjacent tracks of the recording medium.

39. A method according to claim 34, wherein the step of emitting includes utilizing plural light generating elements for emitting respective ones of the plural light beams.

40. An optical information processing apparatus for performing information process on an optical recording medium having tracks on which information is to be recorded, said apparatus comprising:
  (a) means for generating plural light beams;
  (b) means for guiding the plural light beams in a row into a flat space;
  (c) means including a light deflecting element for deflecting all of the light beams, which run in the flat space, within a plane formed by a directional vector of the light beams and a vector of a plane in which the light beams are arranged in a row;
  (d) an optical system for irradiating reflected light beams on the recording medium to form light spots thereon;
  (e) means for detecting the deflected light beams from the recording medium;
  (f) means for obtaining a tracking error from a detection signal from said detecting means;
  (g) means for controlling a deflection angle of the light beams in such a manner that the tracking error is zero; and
  (h) a reproducing means for reading, from the detection signal, information recorded on the tracks of the recording medium.

41. An optical information processing apparatus according to claim 40, further comprising:
  (a) information recording means for recording information on the recording medium;
  (b) said plural light beam generating means being composed of plural light emitting elements which are able to be driven independently; and
  (c) said information recording means having a function of coding a signal including data to be recorded and a function of driving, of the light emitting elements, those to be used for recordation of information.

42. An optical information processing apparatus according to claim 40, wherein the light deflecting element is a single light deflecting element, the optical system enabling formation of plural light spots extending in a row direction on the recording medium, the single light deflecting element being controlled so as to control the deflection of the light beams and enable movement of the plural light spots in a direction transverse to the row extension direction thereof.

43. An optical information processing apparatus according to claim 40, wherein at least three light beams forming at least three light spots extending in the row direction on the recording medium and being adjacent one another, the at least three adjacent light spots being positionable on at least three adjacent tracks of the recording medium.

44. An optical information processing apparatus according to claim 40, wherein the optical pickup includes plural light generating elements as the light source for generating respective ones of the plural light beams.

45. A method of optically processing information on an optical recording medium having tracks, comprising:
  (a) forming plural laser light spots for inputting and outputting information, on the recording medium via an optical system having an optical waveguide with a light deflecting element;
  (b) arranging the plural laser light spots in a row;
  (c) irradiating the laser light spots respectively to the adjacent tracks in such a manner that the row of the laser light spots is disposed at an angle to the tracks on the recording medium;
  (d) detecting reflected light beams from the laser light spots on the recording medium respectively by plural sensors; and
  (e) scanning the row of the laser light spots, at the same time, in a direction substantially perpendicular to the tracks by controlling the light deflecting elements of the optical system to perform a tracking control of the row of the laser light spots collectively.

46. A method according to claim 45, wherein the light deflecting element is a single light deflecting element, and varying a deflection angle of the light deflecting element to enable movement of the light spots in the direction perpendicular to the tracks.

47. A method according to claim 45, wherein at least three light beams forming at least three light spots extending in the row direction on the recording medium and being adjacent one another are formed, the at least three adjacent light spots being positionable on at least three adjacent tracks of the recording medium.

48. A method according to claim 45, further including utilizing plural light generating elements for generating respective ones of the plural light spots.

* * * * *